2,944,060
URAZOLES

Warren J. Close and Daniel A. Dunnigan, Waukegan, Ill., assignors to Abbott Laboratories, North Chicago, Ill., a corporation of Illinois No Drawing. Filed June 25, 1958, Ser. No. 744,354

8 Claims. (Cl. 260—308)

This invention relates to novel derivatives of five-membered heterocycles. More particularly this invention relates to novel derivatives of urazole characterized by the following structural formula:

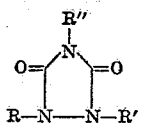

wherein R and R' are members of the group consisting of lower alkyl, such as ethyl, normal propyl, isopropyl, butyl, secondary butyl, isobutyl, amyl and isoamyl, and R" is a member of the group consisting of hydrogen and methyl.

The compounds of this invention are effective in preventing seizures or limiting the extent of seizures induced by the electroshock technique, by Metrazol® and by psychomotor shock and are therefore useful as anticonvulsants.

The novel disubstituted urazole derivatives of this invention can be prepared, for example, by reacting a lower dialkylhydrazine with potassium cyanate to form a lower dialkyl semicarbazide which is reacted with ethyl chlorocarbonate to form a carbethoxy lower dialkyl semicarbazide, which in turn is reacted with sodium alkoxide to form the novel lower dialkyl substituted urazoles.

The novel trisubstituted urazole derivatives are formed by subsequently reacting a novel lower dialkyl substituted urazole with an alkylating agent such as diazomethane or a methyl halide.

The novel disubstituted urazoles, where the substituted derivative groups are not the same, are prepared by reacting a lower alkyl hydrazine with potassium cyanate to form a lower alkyl semicarbazide which is reacted with ethyl chlorocarbonate to form a carbethoxy lower alkyl semicarbazide which in turn is cyclized with sodium alkoxide to form monosubstituted lower alkyl urazole. The monosubstituted lower alkyl urazole is then reacted with potassium hydroxide and an alkylating agent, such as a lower dialkyl substituted sulfate, to form the desired lower dialkyl substituted urazole.

The invention is disclosed in further detail by means of the following examples which are set forth in the purpose of illustrating the invention, but, in no way, are to be considered as limiting the invention in spirit or scope.

EXAMPLE I
1,2-diethylurazole

To a concentrated aqueous solution containing 8.05 g. (0.05 mole) of symmetrical diethyl hydrazine dihydrochloride is added 3.45 g. (0.025 mole) of potassium carbonate in order to half neutralize the salt. To this mixture is then added a concentrated aqueous solution containing 4.05 g. (0.05 mole) of potassium cyanate. This mixture is allowed to stand over night and the product, 1,2-diethyl semicarbazide, is obtained by filtration or in the alternate by concentration before filtration or by extraction with ethyl acetate. The ethyl acetate is distilled off and the product, 1,2-diethyl semicarbazide, is recrystallized from isopropyl ether.

Seventy-five grams (0.575 mole) of 1,2-diethyl semicarbazide is mixed with 62.5 g. (0.575 mole) of ethyl chlorocarbonate and 200 ml. of ethyl acetate. This mixture is refluxed overnight. The solid product, 1-carbethoxy-1,2-diethyl semicarbazide, obtained on cooling is filtered off and washed with ether. Additional product is obtained from the filtrate by combining the filtrate and the washings and concentrating to an oil which is taken up in ether and refiltered. The solution of product, 1-carbethoxy-1,2-diethyl semicarbazide, is then concentrated to an oil in vacuo.

Eighty grams (0.43 mole) of 1-carbethoxy-1,2-diethyl semicarbazide is added to a solution of 9.07 g. (0.395 mole) of sodium and 500 ml. of ethanol. This solution is refluxed for four hours after which the ethanol is distilled off and any of the remaining ethanol is removed in vacuo. The residue is taken up in a minimum quantity of water and acidified, while cooling and stirring, with hydrochloric acid. This solution is then concentrated and extracted with ethyl acetate. The ethyl acetate solution is concentrated to a smaller volume and allowed to cool. The product, 1,2-diethylurazole, is crystallized out, filtered off and washed with a small volume of ethyl acetate. Further crops can be obtained by concentrating the ethyl acetate solutions further. The product is recrystallized from ethyl acetate and has a M.P. of 90–92° C.

Analysis.—Calcd. for $C_6H_{11}N_3O_2$: C, 45.9%; H, 7.1%; N, 26.7%. Found: C, 45.8%; H, 7.3%; N, 26.8%.

EXAMPLE II
1,2-di-n-propylurazole

The same procedure is followed as described in Example I except that 8.75 g. (0.047 mole) of di-n-propylhydrazine dihydrochloride is substituted for diethylhydrazine dihydrochloride. The product, di-n-propylurazole, is obtained, M.P. 91–92° C.

Analysis.—Calcd. for $C_8H_{15}N_3O_2$: C, 51.9%; H, 8.2%; N, 22.7%. Found: C, 51.7%; H, 8.4%; N, 22.4%.

EXAMPLE III
1,2-di-sec-butylurazole

The same procedure as described in Example I is followed except that 108.5 g. (0.382 mole) of di-sec-butylhydrazine dihydrochloride is substituted for diethylhydrazine dihydrochloride. The product, 1,2-di-sec-butylurazole, is obtained, M.P. 119–120° C.

Analysis.—Calcd. for $C_{10}H_{19}N_3O_2$: C, 56.3%; H, 9.0%; N, 19.7%. Found: C, 56.1%; H, 9.0%; N, 19.9%.

EXAMPLE IV
1,2-diethyl-4-methylurazole

Five grams (0.032 mole) of 1,2-diethylurazole, which is the product obtained in Example I, is added to 6.7 moles of diazomethane in ether. This mixture is allowed to stand overnight. It is then filtered and evaporated whereupon the filtrate forms an oil, 1,2-diethyl-4-methylurazole, which is distilled in vacuo, B.P. 86–89° C. at 1.0 mm.

Analysis.—Calcd. for $C_7H_{13}N_3O_2$: C, 49.1%; H, 7.7%; N, 24.6%. Found: C, 48.9%; H, 7.9%; N, 24.5%.

EXAMPLE V
1,2-diisopropylurazole

To a concentrated aqueous solution containing 16.3 g. (0.108 mole) of diisopropylhydrazine hydrochloride is added with stirring 9 g. of potassium cyanate which is also made up into a concentrated aqueous solution. The mixture is allowed to stand over night and the product, 1,2-diisopropyl semicarbazide, is extracted with ether and concentrated to dryness.

A mixture of one mole of 1,2-diisopropyl semicarbazide, one mole of ethyl chlorocarbonate and 500 ml. of ethyl acetate is refluxed over night. A solid product, 1-carbethoxy-1,2-diisopropyl semicarbazide, is obtained on cooling and is filtered off and washed with ether. The additional product is obtained from the filtrate by combining the filtrate and washings and concentrating to an oil which is taken up in ether and refiltered. This mixture is then concentrated to an oil in vacuo.

Eighty grams (0.43 mole) of 1-carbethoxy-1,2-diisopropyl semicarbazide is added to a solution of 9.07 g. (0.395 mole) of sodium and 500 ml. of ethanol. This solution is refluxed for four hours after which the ethanol is distilled off and any of the remaining ethanol is removed in vacuo. The residue is taken up in a minimum quantity of water and acidified, while cooling and stirring, with hydrochloric acid. This solution is then concentrated and extracted with ethyl acetate. The ethyl acetate solution is concentrated to a smaller volume and allowed to cool. The product, 1,2-diisopropylurazole, is crystallized out, filtered off and washed with a small volume of ethyl acetate. Further crops can be obtained by concentrating the ethyl acetate solutions further. The product, 1,2-diisopropylurazole, is recrystallized from ethyl acetate and has a M.P. of 140–141° C.

Analysis.—Calcd. for $C_8H_{15}N_3O_2$: C, 51.9%; H, 8.2%; N, 22.7%. Found: C, 51.9%; H, 8.3%; N, 22.6%.

EXAMPLE VI

*1,2-diisobutylurazole*

The same procedure is followed as described in Example V except that 43.2 g. (0.175 mole) of diisobutyl hydrazine hydrochloride is substituted for diisopropyl hydrazine hydrochloride. 1,2-diisobutylurazole is thereby obtained, M.P. 115–116° C.

Analysis.—Calcd. for $C_{10}H_{19}N_3O_2$: C, 56.3%; H, 9.0%; N, 19.7%. Found: C, 56.6%; H, 9.2%; N, 19.7%.

EXAMPLE VII

*1,2-diisopropyl-4-methylurazole*

1,2-diisopropylurazole, obtained as described in Example V, is added to 6.7 moles of diazomethane and ether. This mixture is allowed to stand over night. It is filtered and evaporated whereupon the filtrate forms an oily product, 1,2-diisopropyl-4-methylurazole, which is distilled in vacuo.

Analysis.—Calcd. for $C_9H_{17}N_3O_2$: C, 54.3%; H, 8.6%; N, 21.1%. Found: C, 54.2%; H, 8.5%; N, 21.3%.

EXAMPLE VIII

*1-isopropyl-2-ethylurazole*

To a cool concentrated aqueous solution containing 81 g. (1 mole) of potassium cyanate is added 46 g. (1 mole) of isopropyl hydrazine. To this solution is then slowly added while stirring 83.5 ml. (1 mole) of concentrated hydrochloric acid. This mixture is allowed to stand over night whereupon it is concentrated to dryness in vacuo and the product, isopropyl semicarbazide, is recovered.

0.575 mole of isopropyl semicarbazide is mixed with 75 g. (0.575 mole) of ethyl chlorocarbonate and 200 ml. of ethyl acetate. This mixture is refluxed over night. The solid product, carbethoxy isopropyl semicarbazide, is obtained on cooling and is filtered and washed with ether. Additional product is obtained from the filtrate by combining the filtrate and the washings and concentrating to an oil which is taken up in ether and refiltered. The product, 1-carbethoxy-1-isopropyl semicarbazide, is then concentrated to an oil in vacuo.

Eighty grams (0.43 mole) of carbethoxyisopropyl semicarbazide is added to a solution of 9.07 g. (0.395 mole) of sodium in 500 ml. of ethanol. This solution is refluxed for four hours after which the ethanol is distilled off and any of the remaining ethanol is removed in vacuo. The residue is taken up in a minimum quantity of water and acidified, while cooling and stirring, with hydrochloric acid. This solution is then concentrated and extracted with ethyl acetate. The ethyl acetate solution is concentrated to a smaller volume and allowed to cool. The product, isopropylurazole, is crystallized out, filtered off and washed with a small volume of ethyl acetate. Further crops can be obtained by concentrating the ethyl acetate solutions further.

Fourteen and three-tenths grams (0.077 mole) of isopropylurazole is dissolved in a solution of 5.6 g. (0.1 mole), of potassium hydroxide, 40 ml. of ethanol and 40 ml. of water. To this solution is then added dropwise, with stirring, 15.4 g. (0.1 mole) of diethyl sulfate. When the addition is complete, the solution is refluxed for four hours. The ethanol is then distilled off and the solution concentrated in vacuo to remove water. The residual product, 1-isopropyl-2-ethylurazole, is extracted with boiling alcohol and is then concentrated to an oil and crystallized. It is then taken up in ethyl acetate, filtered and the ethyl acetate distilled off. The residual product, 1-isopropyl-2-ethylurazole, has a B.P. of 160–165° C. at 2.5 mm.

Analysis.—Calcd. for $C_7H_{13}N_3O_2$: C, 49.1%; H, 7.7%; N, 24.6%. Found: C, 49.3%; H, 7.2%; N, 24.1%.

Others may practice the invention in any of the numerous ways which will be suggested by this disclosure to one skilled in the art. All such practice of the invention is considered to be a part hereof provided it falls within the scope of the appended claims.

We claim:
1. 1,2-diethylurazole.
2. 1,2-di-n-propylurazole.
3. 1,2-di-sec-butylurazole.
4. 1,2-diethyl-4-methylurazole.
5. 1,2-diisopropylurazole.
6. 1,2-diisobutylurazole.
7. 1,2-diisopropyl-4-methylurazole.
8. 1-isopropyl-2-ethylurazole.

References Cited in the file of this patent

Nirdlinger et al.: Am. Chem. J., vol. 43, pp. 358–84 (1910).

Brunel et al.: Am. Chem. J., vol. 43, pp. 505–553 (1910).

Goodwin et al.: J. Am. Chem. Soc., vol. 47, pp. 167–74 (1925).

Arndt et al.: Chem. Abstracts, vol. 42, cols. 8190–91 (1948).

Tsuji: Chem. Abstracts, vol. 50, col. 12032 (1956).